United States Patent [19]

Costes et al.

[11] Patent Number: 4,809,155
[45] Date of Patent: Feb. 28, 1989

[54] VERY HIGH SPEED LINE ADAPTER FOR A COMMUNICATION CONTROLLER

[75] Inventors: Michel L. Costes, Cagnes Sur Mer; Gerard Dalboussiere, Vence, both of France; Kenneth J. Barker, Cary, N.C.

[73] Assignee: International Business Machines Corp., Armonk, N.Y.

[21] Appl. No.: 33,388

[22] Filed: Apr. 2, 1987

[30] Foreign Application Priority Data

Apr. 30, 1986 [EP] European Pat. Off. ......... 864300157

[51] Int. Cl.⁴ .............................................. G06F 3/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,261,035 | 4/1981 | Raymond | 364/200 |
| 4,292,669 | 9/1981 | Wollum et al. | 364/200 |
| 4,322,793 | 3/1982 | Andersson et al. | 364/200 |
| 4,390,963 | 6/1983 | Puhl et al. | 364/900 |
| 4,493,051 | 1/1985 | Brezzo et al. | 364/900 |
| 4,504,901 | 3/1985 | Calvignac et al. | 364/200 |
| 4,509,113 | 4/1985 | Heath | 364/200 |

Primary Examiner—Thomas M. Heckler
Attorney, Agent, or Firm—Joscelyn G. Cockburn

[57] ABSTRACT

The high speed line adapter comprises a bit handling layer (34,46) and a byte handling layer (36,50) and a receive queue mechanism (48).

The bit layer receives the frames from the high speed line 9. It performs the SDLC protocol, it removes the flag and BCC characters and adds one ending condition control character which indicates whether the frame was correctly received or not. It causes the address and control fields, the data if any and the ending condition character to be stored into a receive queue buffer at the first free address. The byte layer 50 takes out the frame characters from the receive queue as soon as a pool buffer is available in the memory of the central unit of the communication controller. It sends the data if any to said memory through a direct access memory bus and sends the address and control fields and the ending condition to the microprocessor of the adapter.

The provision of the receive queue mechanism allows high speed lines to be connected to a communication controller, without modifying its network control program.

8 Claims, 9 Drawing Sheets

VERY HIGH SPEED LINE ADAPTER FOR A COMMUNICATION CONTROLLER

DESCRIPTION OF THE INVENTION

1. Field of the invention

This invention relates to a line adapter accommodating the very high speed lines which may be connected to a Communication Controller.

2. Background art

In communication controllers such as the IBM 3705 or 3725 Communication Controllers, there is a response time between the Central Control Unit CCU and the line scanners. For the present time, this response time is not critical, since these communication controllers cannot be connected to lines working at more than 256 kilobits per second.

However, the line scanners which are actually implemented in these communication controllers cannot be used for connecting the controller to lines working at very high speeds.

Consequently, there is now a need to implement line adapters able to support line speeds which are higher than 256 kilobits per second and which may be in the range of 2 to 8 Megabits per second.

The problems which are raised at such high bit rates are the following:

At 2 megabits per second, in receive mode, one byte is received every 4 microseconds and at 8 megabits per second, one byte is received every microsecond. Consequently, it is no longer possible as in the normal scanner, such as described in U.S. Pat. Nos. 4,493,051 and 4,504,901 to have the received data handled by the microcode of the microprocessor in the line scanner and transmitted to the Central Control Unit main store via the input/output IOC bus.

Furthermore, the communication controller works under control of a network control program NCP. To receive data from the lines, the network control program assigns so called NCP buffers to the line. Each NCP buffer has a maximum length of 240 bytes. Actually the high speed data are received in structured SDLC frames and the size of the incoming SDLC frame is known at the end of the frame. In the Systems Architecture Network of the SNA type, the SDLC frame can have a maximum length of 64 kilobytes. Due to the limited number of buffers shared between several users, the network control program allocates to one receive line interface a minimum pool of buffers. Consequently, if the frame is long and does not fit in the allocated pool, a new buffer pool must be requested by the adapter. At 8 megabits per second, with a buffer length of 240 bytes, the network control program should allocate a new pool in less than 240 microseconds to avoid having an overrun on the receive interface. With the present structure of the network control program, this is not possible.

Furthermore, another problem is raised by the SDLC multiframing, which means that the line adapter may receive several SDLC frames. The frames are separated by one SDLC flag only, the final flag of the frame n−1 is the initial flag of the frame n. A SDLC information frame (frame with data) may only be 6 bytes long, comprising the following bytes: flag F, address A, control C, data, BCC1, BCC2. At 8 megabits per second, this means that two frames are separated by 1 microsecond only and may arrive every six microseconds.

The present structure of the network control program does not allow a new RECEIVE COMMAND to be sent in less than six microseconds and does not allow a new buffer pool to be allocated in less than six microseconds to avoid overrun on the receive interface.

To solve the problem raised by the limited length of the buffer pool, the network control program could be modified so as to allocate enough buffers in a pool to cover the maximum SDLC frame length. This solution has a major drawback, since it impacts the other users and leads to a poor utilization of this long buffer pool in case of short frames.

Furthermore in order to accept the multi-frames in the above described conditions without causing any overruns a complete restructuring of the network control program would be required.

Another solution would consist of providing a processing layer in the adapter microprocessor to fit with the present network control program structure. This solution has a major drawback, since it would require a very powerful microprocessor and a fast associated memory to handle the process of the network control program commands plus the buffering of the incoming SDLC frame data and their transfers into the central control unit memory.

SUMMARY OF THE INVENTION

An object of the present invention is to provide a high speed line adapter specifically designed to allow a communication controller to be connected to high speed lines without modifying its network control program.

The high speed line adapter comprises a microprocessor (22) working under control of a stored microcode and a front end scanner (26) attached to at least one full duplex high speed line (9), said adapter being part of a communication controller comprising a central control unit (CCU 1) working under control of a network control program stored in a memory (2), said program allocating a minimum number of buffers in said memory for the reception of frames comprising address, control fields and data, from the line. The adapter is attached to the central control unit through an input/output bus (6) and to the memory through a direct memory access bus (10).

According to the invention it comprises:
first receiving means (46) connected to the line for receiving the frames and causing the received bits to be arranged into characters comprising a byte of received bits, a bit indicating that a character is ready, and to be checked for generating an ending condition character for each frame indicating whether the frame was correctly received or not, and providing on their output bus (52), the frame characters and the ending condition character for each received frame,
receive queue buffer mechanism (48) comprising:
a receive queue (100), having a plurality of addressable locations, the content of which may be read through a data out bus 106 and into which characters may be written through a data in bus 104,
input means (FIG. 7) causing the receive queue to be accessed by the first receiving means for writing the frame characters and the ending condition character relative to each received frame when the receive queue is not full and for generating an overrun signal when the receive queue is full, said signal preventing the subsequent received characters to be written in said receive queue, as long as the queue is full, output means (FIG. 8)
second receiving means (50) connected to the output means which causes the receive queue to be read under control of the network control program, when said receive queue is not accessed by the first receiving means for reading the frame characters and ending condition character relative to each frame and sending the address, control and ending condition bits of said characters to the central control unit through the microprocessor and input-/output bus (6) and the data bits of said characters directly into the allocated buffers of the central control unit memory (2) through the direct access memory bus (10).

DETAILED DESCRIPTION OF THE INVENTION

Figure 1:
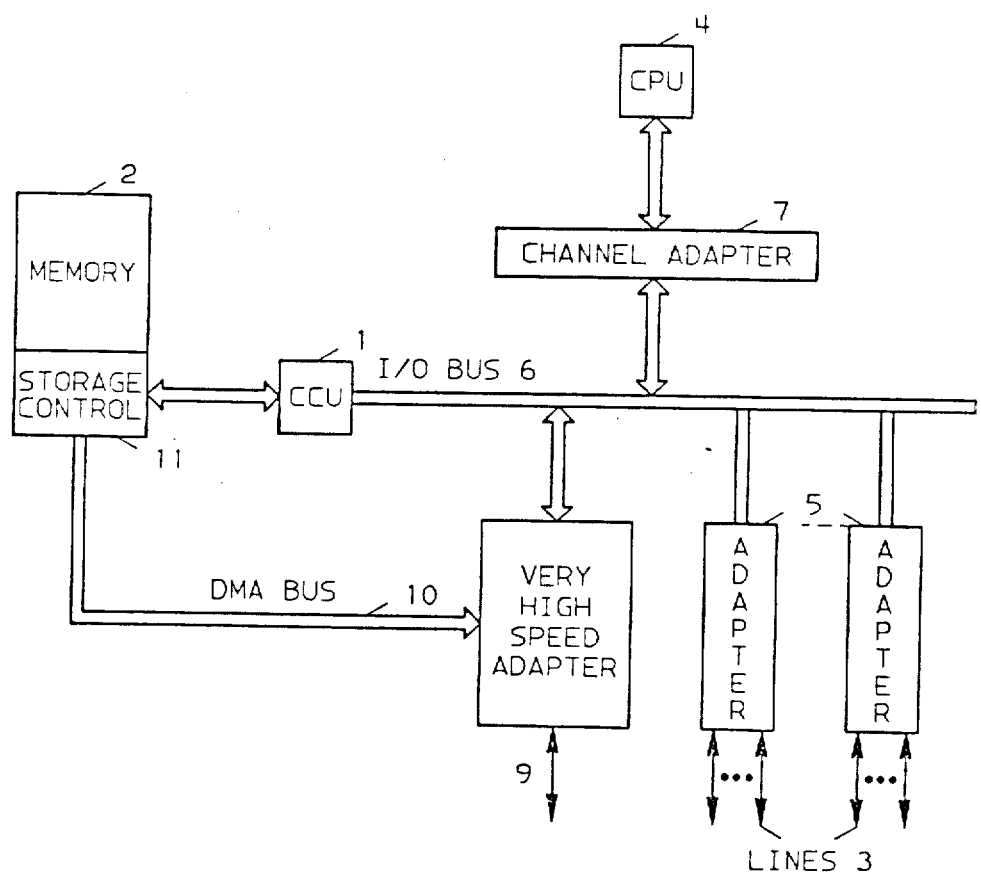
FIG. 1 represents the general arrangement of a communication controller in which the mechanism according to the present invention may be incorporated.

As shown in FIG. 1, the communication controller comprises central control unit CCU 1 which operates under a network control program NCP stored in memory 2. Memory 2 is also devoted to the storage of data and control information from lines 3 or from central processing unit CPU 4. The central control unit CCU 1 controls the data exchanges between the lines connected to users (i.e. terminals or other communication controllers) and central processing unit CPU 4.

Such as described in U.S. Pat. Nos. 4,493,051 and 4,504,901 lines 3 are connected to line adapters 5 which are attached to central control unit CCU 1 through Input/output I/O bus 6. The interface between Central Control Unit CCU 1 and bus 6 is described in European patent application No. 89 440. Central processing unit 4 is connected to I/O bus 6 through channel adapter 7.

Lines adapters 5 are the conventional adapters as described in above referenced U.S. patents.

According to the invention, one or several high speed line adapters 8 are connected to I/O bus 6. Adapter 8 differs from adapter 5 in that it comprises specific means which will be described later on, which allows the adapter to receive data at high speed rates from one high speed line 9, and in that it has directly access to memory 2 through a direct memory access DMA bus 10.

Accesses to memory 2 are controlled through control circuit 11.

Figure 2:
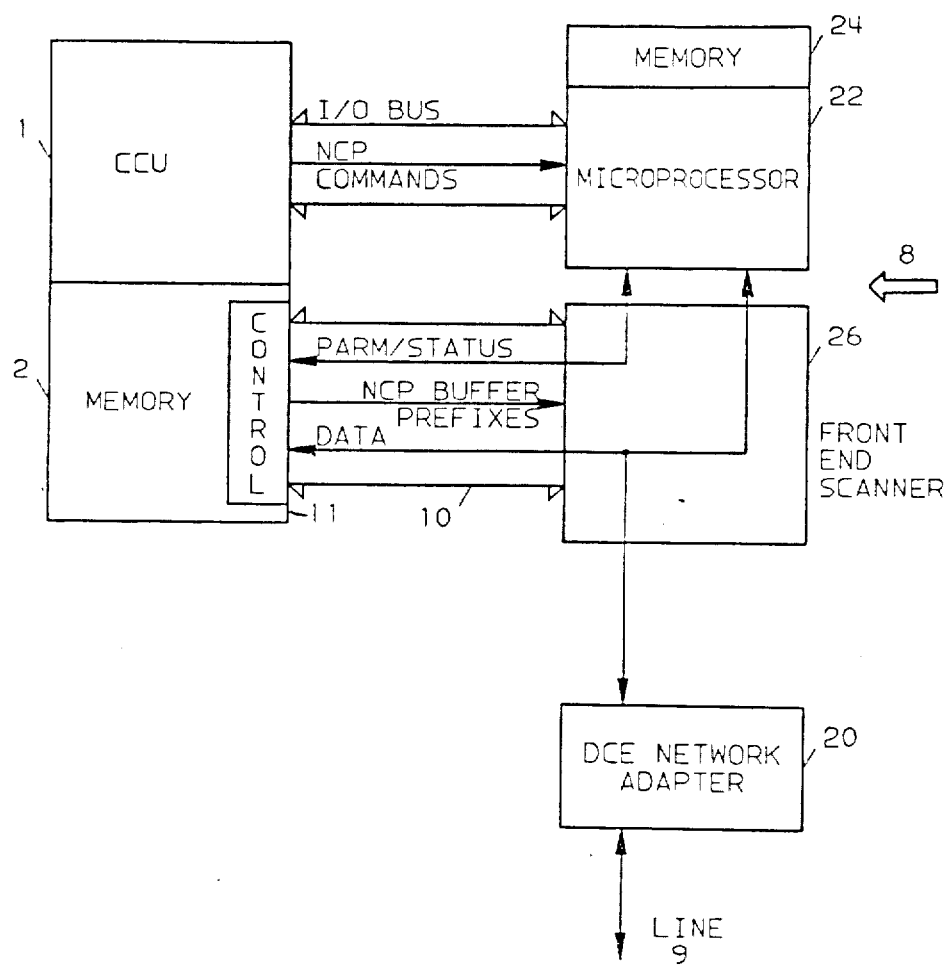
FIG. 2 represents in more details the arrangement of the high speed line adapter according to the invention.

FIG. 2 shows the general data flow in high speed adapter 8. It is assumed that this adapter supports one data link with the following characteristics: SDLC full duplex leased line operating at speeds up to 8 megabits per second.

The line is attached to data communication equipment DCE network adapter 20 which comprises the conventional liner receiving and driving circuits.

High speed adapter 8 comprises as the conventional adapters 5, microprocessor 22 associated to memory 24 and front end scanner 26.

Microprocessor 22 operates under control of the microcode stored in memory 24 and controls the operation of front end scanner 26. It receives the network control program NCP commands though I/O bus 6, manages the parameters/status information as described in U.S. Pat. No. 4,504,901.

DMA bus 10 is used for the NCP buffer prefix exchange between the network control program and front end scanner 26, the data transfer from/to the line to/from CCU memory 2 and the parameter/status exchange between the network control program and the microprocessor microcode.

Figure 3:
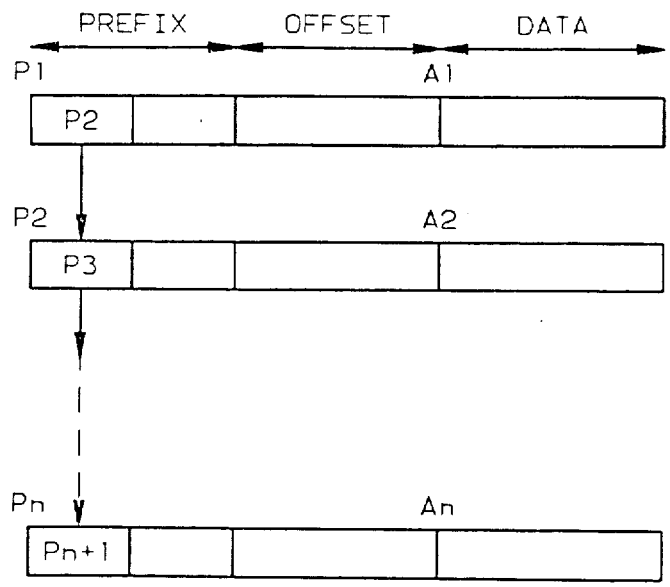
FIG. 3 represents how the NCP buffers are chained and the prefix format.

The NCP buffers are chained as shown in FIG. 3. They comprises three fields. A prefix field, the format of which is represented in FIG. 3, an offset field and a data field. The first address of the data area of a buffer is An, the first address of a buffer is pn, $pn+1=0$ indicates the end of the buffer chain.

The prefix field comprises eight bytes:
Byte 0: not used
Bytes 2-3: $pn+1$ chain pointer to next buffer
Bytes 4-5: NCP program use only
Byte 6: length of the offset field
Byte 7: data count These prefixes have to be sent to front end scanner 26 to calculate the data addresses in the buffer chain.

In transmit, the first buffer data address A1 is equal to:

$$A1 = p1(from\ PSA) + prefix\ length\ (set\ mode) + offset\ (from\ PSA)$$

Count 1 = count from PSA (number of bytes to be transmitted)

The offset and data count for the first NCP buffer are obtained by the microcode from the parameter status area (PSA) in microprocessor memory 24. In memory 24 such an area is assigned to the transmit and receive line interface and is used for storing parameters and status information. The parameters are loaded during the set mode as described in U.S. Pat. No. 4,504,901 and EU patent application No. 89 440.

The offset and count contained in the prefix of the first buffer may be different from these values and are not to be used by front end scanner 26.

The data address An of buffer n when n is higher than 2 is:

$$An = pn\ from\ prefix\ (n-1) + prefix\ length + offset\ from\ prefix\ n$$

Count=count from prefix n (Number of bytes to be transmitted)

For a receive operation, the first buffer data address A1 is:

$$A1 = pl \text{ (from PSA)} + prefix \text{ } length \text{ (set mode)} + offset \text{ (from PSA)}$$

Count 1 = count from PSA

As in transmit, the offset and data count for the first NCP buffer are obtained by the microcode from the parameter area PSA.

The offset and count contained in the prefix of the first buffer may be different from these values and are not to be used by front end scanner.

The data address An for buffer n when n is higher than 2 is:

$$An = pn \text{ from prefix } (n-1) + prefix \text{ } length \text{ (set mode)}$$

Count n = count from set mode (NCP receive data area maximum length)

The offset for the receive buffers is assumed to be zero. The count (data area maximum length) is given by NCP during the set mode. The offset and count contained in the prefix of NCP receive buffers may be different from these values and are not to be used by front end scanner.

Figure 4:
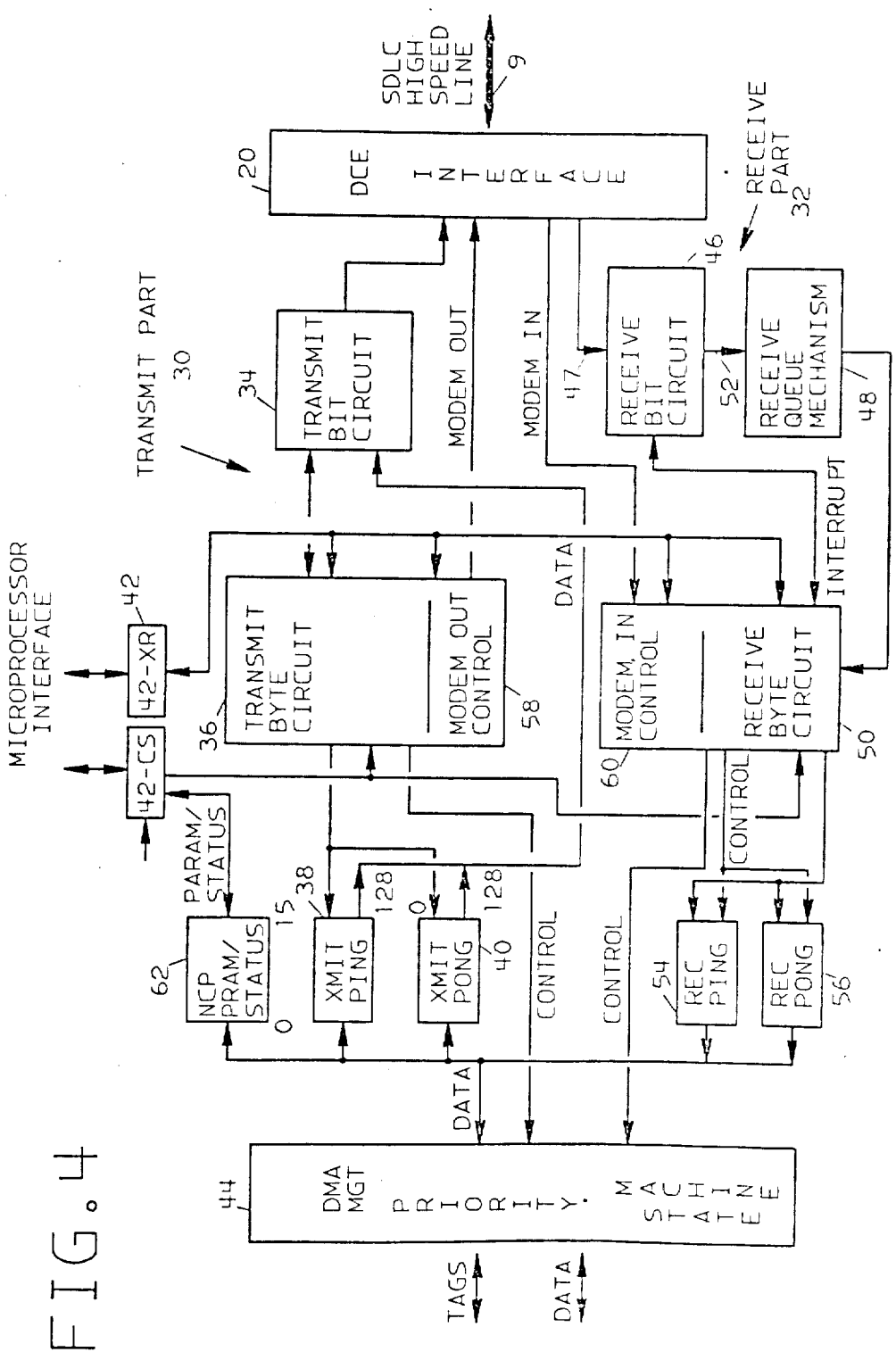
FIG. 4 represents the data flow in the front end scanner.

FIG. 4 represents the general data flow of front end scanner. It comprises transmit and receive parts 30 and 32, which correspond to processing layers working at the bit and byte levels, respectively.

In transmit part 30, transmit bit logic circuit 34 performs the following functions: serialization of the bits to be transmitted, flag generation for separating the SDLC frames, zero insertion which consists in inserting a zero after five consecutive ones for preventing the data from being similar to the flag pattern 01111110 and generating of the cyclic redundancy code CRC for the error detection purpose.

Transmit byte logic circuit 36 handles the byte transfer between transmit ping and pong registers 38 and 40 and circuit 34, handles SDLC address A and control C fields from microprocessor memory 24, handles NCP buffer prefixes for transmit operations, interfaces with the interface of microprocessor 22.

Interface 42 is activated and controlled via external registers and control words CW. A control word is built by the microcode of microprocessor 22 specifies the actions to be performed by front end scanner 26. The control words are cycle stealed by scanner 26 and then executed. Scanner 26 signals the completion of the execution of the control word to microprocessor 22. Thus interface 42 comprises external registers 42-XR and cycle steal control mechanism 42-CS.

Transmit ping and pong registers 38 and 40 are 256 bytes long each in a preferred embodiment. They interface with direct access memory DMA manager 44 and transmit byte circuit 36.

Receive part 32 comprises receive bit logic circuit 46 which deserializes the received bits and handles the received bit stream. It performs the SDLC protocol (flag recognition/deserialization/zero deletion and abnormal condition detection). It calculates the CRC code, makes the SDLC station address compare function. These functions are conventional and will not be described in details.

Figure 6:
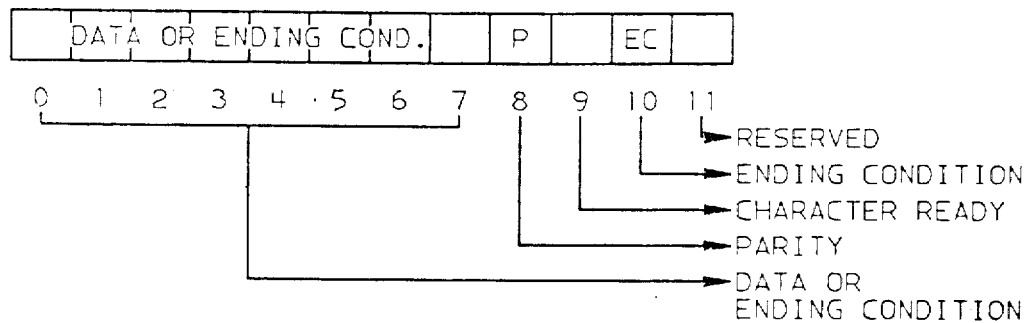
FIG. 6 represents the queue word format and the ending condition word format.
Figure 6:
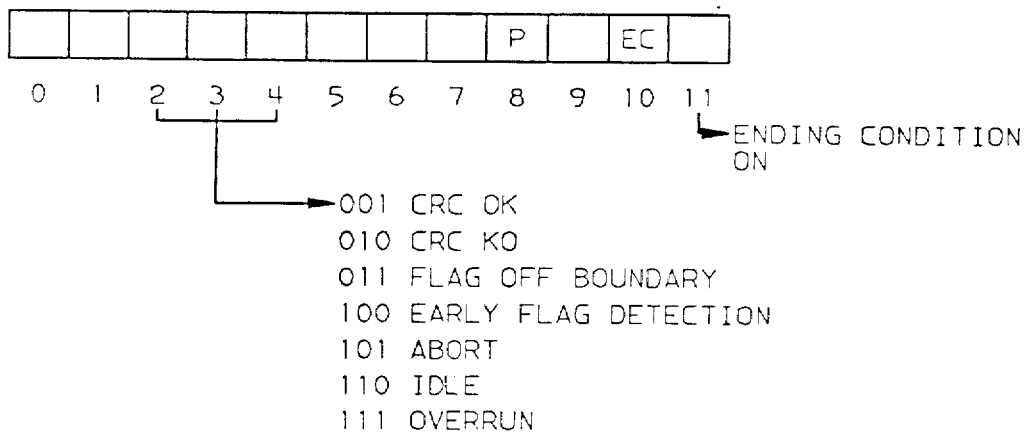

According to the invention, circuit 46 removes from the incoming SDLC frame, the control characters and bits (flag, BCC add inserted zeroes) and generates an ending condition character therefrom. This ending condition character indicates how the frame was received. A specific format of the ending condition character is shown in FIG. 6 which will be described later on. The function of this character is to indicate how a frame was received.

Receive queue mechanism 48 makes the interface between receive bit circuit 46 and receive byte circuit 50.

As will be described later, the provision and operation of receive queue mechanism 48 are essential to the present invention.

Figure 5:
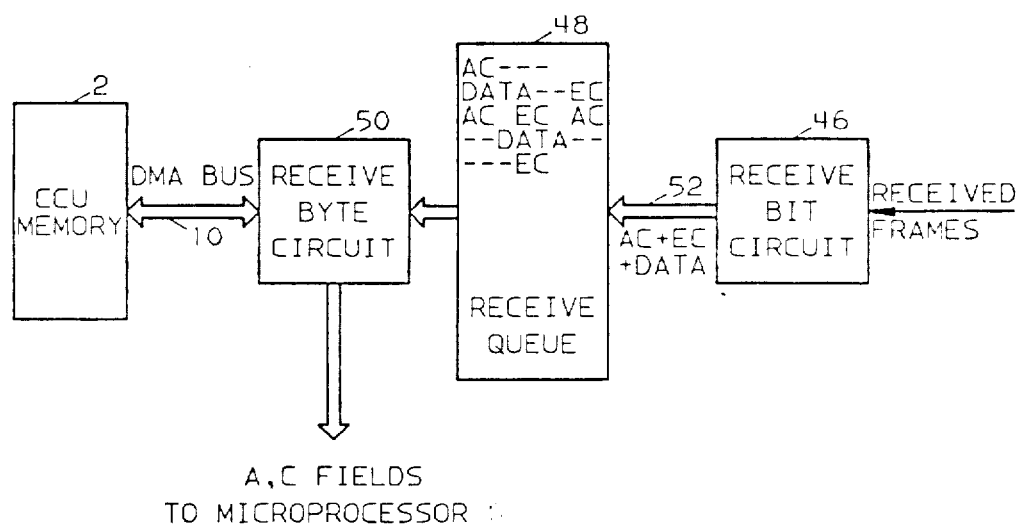
FIG. 5 represents the data flow between receive bit circuit 46 and receive byte circuit 50 through receive queue mechanism.
Figure 7:
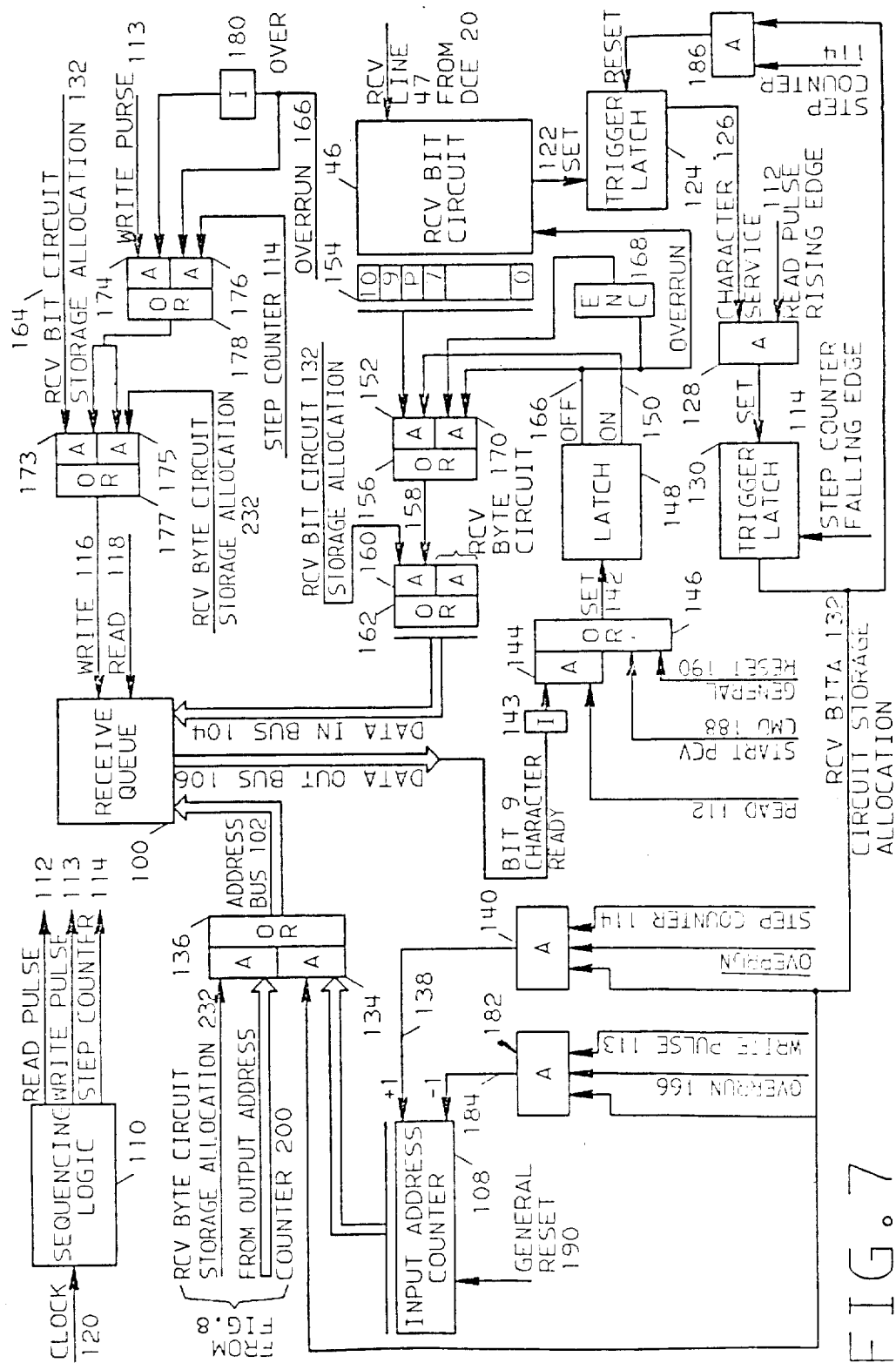
FIG. 7 represents the logic arrangement allowing the receive queue to be, loaded from circuit 46.
Figure 8:
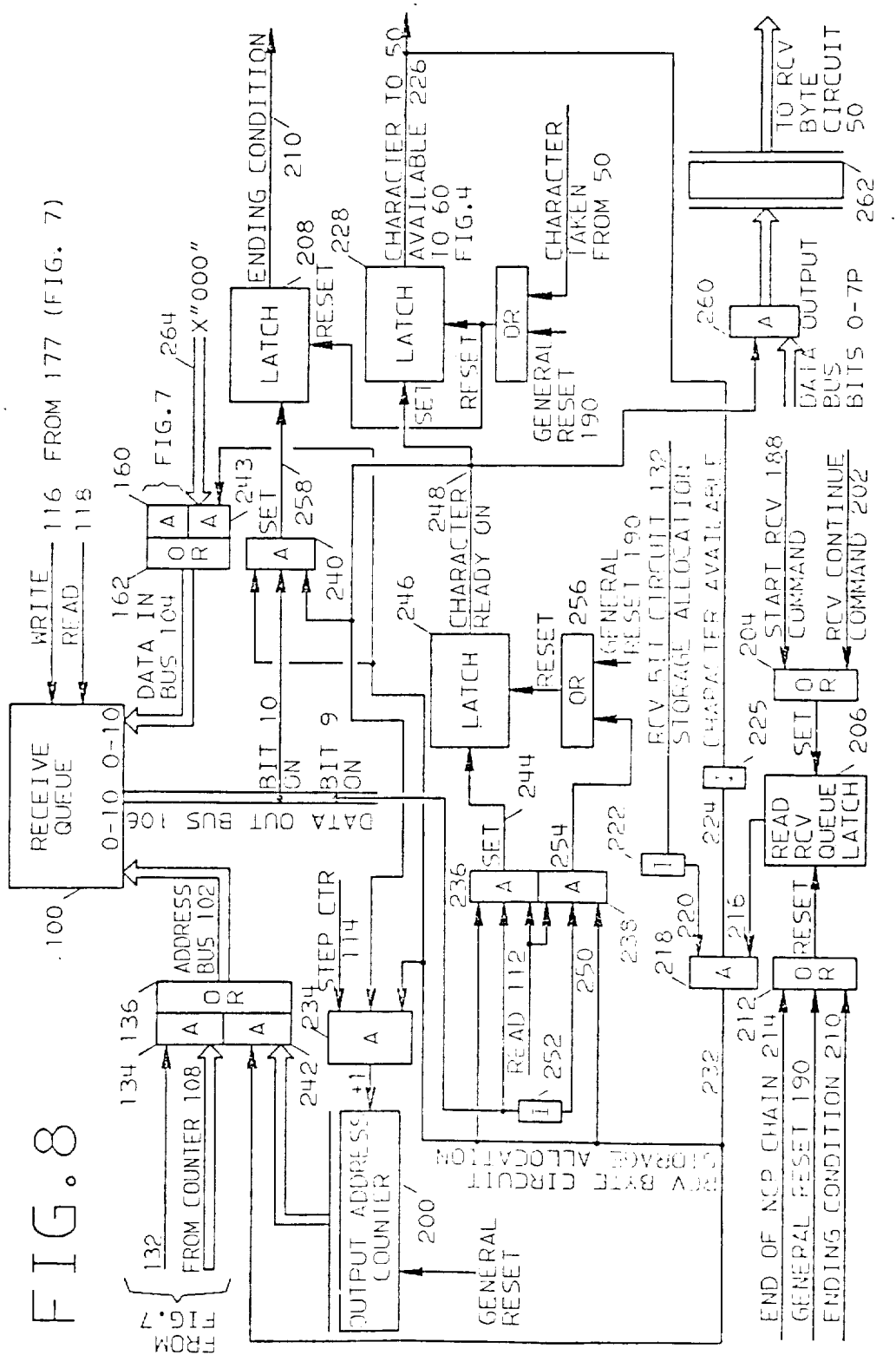
FIG. 8 represents the logic arrangement allowing the receive queue to be read by circuit 50.

In a preferred embodiment of the invention, receive queue mechanism 48 includes a queue buffer referenced as 100 in FIGS. 7 and 8. It accumulates the incoming SDLC frames from the receive bit circuit 46 i.e the address A, control C fields, the data if any and the ending condition character EC as schematically represented in FIG. 5.

The purpose of receive queue mechanism 48 is to avoid overrun conditions in case of a temporary non availability of NCP buffer prefixes or delays in the reception of START RECEIVE commands from the network control program. At a given time, the queue may contain multi SDLC frames, each frame in the queue includes only information (i.e. adress+control+- data) plus one ending condition character provided by the receive bit circuit 46.

Queue buffer 100 in mechanism 48 is always available and independent of the network control NCP buffers availability, within the limit of the buffer size. The size of this buffer depends on the average NCP response time. In a preferred embodiment of the invention, a 4 kilobytes buffer is used.

When an NCP buffer pool is available, the first frame stored in queue buffer 100 is taken out at a much higher speed than the incoming bit rate and sent to the CCU memory 2 through DMA bus 10. The corresponding buffer space is freed and ready to receive a new incoming frame.

Receive byte circuit 50 handles the byte transfer between receive ping and pong registers 54 and 56, and receive queue buffer 48. It handles the transfers of SDLC address A and control fields C from receive queue buffer 100 in mechanism microprocessor 48 TO 22 via external registers 42-XR. It handles the NCP buffer prefixes received from memory 2 and interfaces with microprocessor 22.

Receive ping and pong registers 54 and 56 interface with direct access memory control circuit 44 and receive byte circuit 50. They work in flip-flop mode and are used to transfer the data from receive queue mechanism 48 via direct access memory bus 10 to the NCP buffers in memory 2.

Transmitting part 30 comprises in transmit byte circuit 36, control means 58 for activating the modem control leads when the SDLC link is attached to a modem (not shown). These control leads are activated according to a control word CW received from the microprocessor microcode via external register 42-XR. In receive part 32, modem in control means 60 interfaces with the microprocessor via external register 42-XR. It performs the state confirmation of the input modem control leads. It reports input modem control lead changes according to control words prepared by the microcode.

Data management means 62 handles the transfers from/to NCP to/from microprocessor memory 24 of any information mainly the NCP parameters and status. It includes one 64 byte buffer.

Direct memory access manager 44 handles DMA bus 10 protocol, performs the data transfers from/to CCU memory 2 to/from buffer 62. Furthermore it handles the priorities of DMA bus requests by giving the highest priority to the data management means requests, second priority to the transmit byte circuit requests, third priority to the receive byte circuit requests. The priority is reconsidered after each burst transfer over DMA bus 10. This results in interleaved operations. It receives from the circuit being serviced, the starting CCU memory 2 address (24 bits), the direction of transfer (read/write), the byte count of data to be transferred.

Interface 42 with microprocessor 22 including microprocessor external registers 42-XR and cycle steal management mechanism 42-CS, interfaces on one side with microprocessor memory 24 and on the other side, with front end scanner 26. It handles the protocols of the microprocessor external registers and cycle steal operations. It also handles the priorities of cycle steal requests from the various parts of front end scanner 26 on a rotation basis.

As shown in FIG. 6, receive queue buffer 100 in mechanism 48 is organized in 12 bit-characters. Bits 0 to 7 are used for storing a data or ending condition character, bit 8 is the parity bit, bit 9 indicates whether the character is ready or not, bit 10 indicates whether bits 0 to 7 are data bits or ending condition character bits, bit 11 is not used.

The ending condition characters have the same format, with bits 2, 3 and 4 coded as follows:

0 0 1 CRC correct
0 1 0 CRC not correct
0 1 1 Flag off boundary
1 0 0 Early flag detection
1 0 1 Abort
1 1 0 Idle
1 1 1 Overrun It will be described, the operations which are performed for transmitting or receiving an SDLC frame assuming the SDLC address A and control C fields have been processed.

Before issuing a START TRANSMIT or START RECEIVE command, the microcode controlling microprocessor 22 provides to front end scanner 26,
 the starting address A1 of the first NCP buffer
 the offset of the first NCP buffer (from the parameter/status area PSA)
 the prefix length (at set mode)

After receiving a START TRANSMIT or START RECEIVE command, front end scanner 26 sends from/to microprocessor memory 24 the A and C fields, then:
 gets buffer prefix n
 calculates data starting address An
 gets/sends from/to ping pong registers, the data from/to the NCP buffer
 detects end of the NCP buffer chain ($pn+1=0$)
 When the end of chain is detected,
 In transmit, front end scanner 26
  sends CRC and then continuous flags or puts the line at all marks
  provides the microcode with the end of transmission status EOT and with the last NCP buffer prefix address used (Cn)
  interrupts the microcode
 In receive, front end scanner 26
  provides the microcode with:
 Buffer requested status and
 last NCP buffer prefix address used (Cn)
  interrupts the microcode
  resumes the process on reception of a Receive Continue command from microcode with new buffer prefix starting address $Cn+1$.

It will now be described in reference to FIGS. 7, 8 and 9, the mechanism which allows the receive queue buffer to be loaded by receive bit circuit 46 and unloaded by receive byte circuit 50.

FIG. 7 shows the logic arrangement which is implemented on the receive bit circuit side and FIG. 8 shows the logic arrangement which is implemented on the receive byte circuit side. These logic arrangements are part of receive queue mechanism 48 shown in FIG. 4.

Receive queue mechanism 48 comprises four main components: the storage area schematically shown as receive queue 100 in FIGS. 7 and 8, input address counter 108 (FIG. 7), output address counter 200 (FIG. 8) and sequencing logic 110.

The size of receive queue 100 depends upon the parameters related to the application (line speed, control program response time). As described above, the storage area is 4K words and each word is 11 bits long as described in reference to FIG. 6.

The addresses are provided to receive queue 100 on address bus 102, the data to be written in receive queue 100 are provided on data in bus 104, and the data read from receive queue 100 are provided on data out bus 106.

Receive queue 100 is selected for a writing operation under control of a write control pulse on line 116 and is selected for a reading operation under control of a read control pulse on line 118.

Sequencing logic 108 sequentially generates read pulses on output line 112, write pulses on output line 113 and step counter pulses on output line 114, from a free running clock providing regular clock pulses on line 120.

Figure 9:
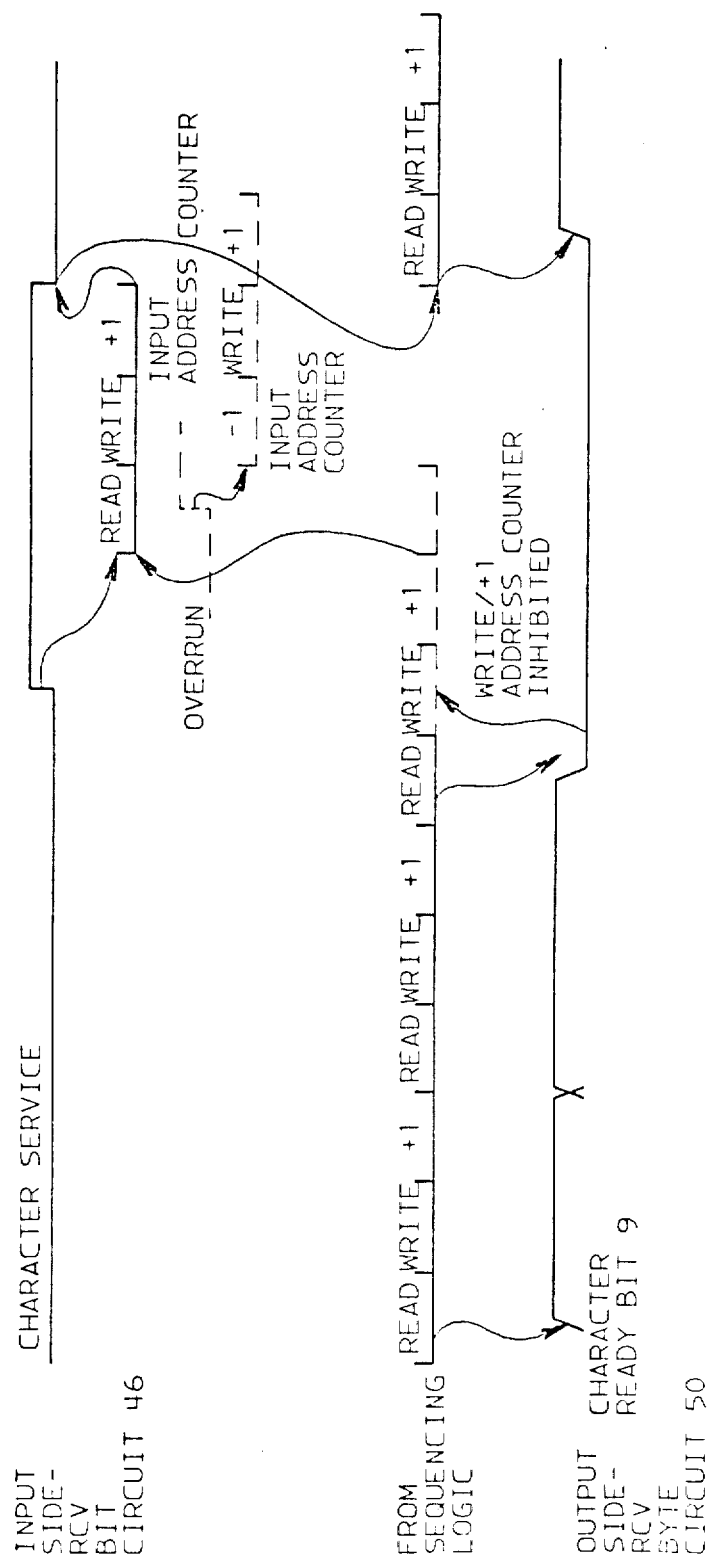
FIG. 9 represents the timing diagram of the read and write operations.

These pulses are active in the sequence READ, WRITE, +1 as schematically shown in FIG. 9.

The purpose of the logic arrangement of FIGS. 7 and 8 is to provide the read and write control pulses on lines 116 and 118 at the correct times to cause the received bytes to be loaded into receive queue 100 from circuit 46 and unloaded from receive queue 100 to be transferred by circuit 50 to receive ping and pong registers 54, 56.

Input address counter 108 which is a 13 bit counter (12 bits+parity) is used by receive bit circuit 46. It contains the address where circuit 46 has to place the received information character. Once a character has been stored, counter 108 is stepped forward by one position and remains in this position, until a new information character is available. When counter reaches its maximum capacity, it wraps around.

When a character is ready to be sent by circuit 46, circuit 46 provides an active signal on line 122 which sets latch 124. Latch 124 provides an active output signal on CHARACTER SERVICE line 126. As shown in the timing diagram of FIG. 9, at the next rising edge of the reading pulse on line 112, AND gate 128 is conditioned and latch 130 is set. Latch 130 provides, a RECEIVE BIT CIRCUIT STORAGE ALLOCATION signal on its output 132. When this signal is active (UP level), AND gate arrangement 134 is conditioned and provides the content of input address counter 108 to OR gate arrangement 136 which provides the receive queue address on address bus 102.

Once the character is stored into receive queue 100, input address counter 108 is stepped forward by one position under control of the signal on output line 138 of AND gate 140 which is conditioned by the step counter pulse from line 114 when an overrun condition is not detected by circuit 142.

When RECEIVE BIT CIRCUIT STORAGE ALLOCATION signal becomes active, the read pulse on line 112 is provided on line 118 and the the receive queue location, the address of which is contained in counter 108 is read.

Bit 9 of data output bus 106 is inverted in inverter 143, the output line of which is provided to one input of AND gate 144 which is conditioned by the read pulse on line 112. The output signal of AND gate 144 is provided to OR gate 146.

If bit 9 is off, indicating that the addressed receive queue location is empty, the output signal of OR gate 146 sets latch 148. Latch 148 provides an active output signal on line 150. This signal conditions AND gate arrangement 152, which provides the character from output register 154 of circuit 46 to OR gate arrangement 156. Output bus 158 of OR gate arrangement 156 is provided to AND gate arrangement 160 which is conditioned by the RECEIVE BIT CIRCUIT STORAGE ALLOCATION signal from line 132. The output bus of AND gate arrangement 160 is provided to OR gate arrangement 162, which provides on data-in bus 104, the data to be written in receive queue 100 under control of the write control pulse on line 116 generated by circuit 164.

When character ready bit 9 is found on, indicating that the queue location is not empty, latch 148 is not set and signal on output line 166 is active. This is indicative of an OVERRUN condition which is reported to circuit 46. This causes bits 2, 3, 4 and 10 to be set to 1, by encoding circuit 168 as shown in FIG. 6.

The output of encoding circuit 168 is provided to AND gate arrangement 170 which is conditioned by the active signal on line 166. The output bus of AND gate arrangement 170 is provided to OR gate 156, to be written into receive queue 100 through AND-OR gate arrangement 160-162.

Write circuit 164 comprises two gating arrangements. The first one comprises AND gates 174, 176, OR gate 178 and inverter 180. The second one comprises AND gates 173, 175 and OR gate 177.

Inverter 180 receive the OVERRUN signal from line 166, and thus provides on its output line 182 a signal which is active when no overrun is detected. This signal conditions AND gate 174 which thus provides the write pulse on line 113 to OR gate 178. The output of OR gate 178 is provided to one input of AND gate 173 which is conditioned by the RECEIVE BIT CIRCUIT ALLOCATION signal on line 132. Thus AND gate 173 provides the write pulse from pulse to receive queue 100. If the OVERRUN signal is active line 113 to OR gate 177. OR gate 177 provides the write control pulse on line 116 so as to cause the content of register 154 to be written into the addressed location of receive queue 100. AND gate 176 is conditioned to pass the step counter pulse on line 114 to OR gate 178.

At that time, AND gate 182 is conditioned at the write pulse time, and provides an active output signal on its output line 184, this causes the content M of input address counter 108 to be stepped backward by one position. The step counter pulse on input 114 of AND gate 140 is inhibited, and this pulse is gated to write control line 116 through gating arrangement 176, 173. The overrun ending condition on data input bus 104 is written at address M − 1.

At the end of the step counter pulse, latch 124 is reset through the output signal of AND gate 186, the input line of which are lines 132 and 114. Thus the CHARACTER SERVICE LINE 126 is inactive, the OVERRUN line remains active. Thus circuit 46 will discard further incoming characters and will not raise CHARACTER SERVICE line 126. OVERRUN signal will be reset by the reception of a new START RECEIVE COMMAND which is sent by the control program on input line 188 of OR gate 146 or by a GENERAL RESET command on line 190. The general reset command is also provided to reset input of input address counter 108.

The logic arrangement of FIG. 8, which allows receive queue 100 to be read will now be described.

The operation of the circuit shown in FIG. 8 is initiated by a START RECEIVE COMMAND or by a RECEIVE CONTINUE COMMAND which are received from the control program on lines 188 and 202. These commands are provided to the input of OR gate 204 which provides an output signal which cause READ RECEIVE QUEUE latch 206 to be set.

Latch 206 is reset by an ending condition signal provided on output line 210 of latch 208, or by the GENERAL RESET signal on line 190 or when the end of NCP chain is signaled on line 214. Lines 214, 190 and 210 are provided to OR gate 210 which provides the reset signal to latch 206.

AND gate 218 has three inputs, the first one is connected to line 220 which receives from inverter 222, the inverse of the RECEIVE BIT CIRCUIT STORAGE ALLOCATION signal from line 132 (FIG. 7), the second input is connected to line 224 which receives the inverse of CHARACTER AVAILABLE signal, from inverter 225 and the third input is connected to output line 216 of latch 206.

CHARACTER AVAILABLE signal is generated on output line 226 of latch 228 as will be described later on.

When AND gate 218 is conditioned, RECEIVE BYTE CIRCUIT STORAGE ALLOCATION signal on output line 232 is active. This signal conditions AND gates 234, 236, 238, 240, 242 and 243. At that time AND gate 134 shown in FIG. 7 is not conditioned so that the receive queue address bits are no more provided on address bus 102 by input address counter 108 of FIG. 7 but they are provided by output address counter 200 through AND gate 242.

AND gate 236 has three input lines, namely line 232, READ pulse line 112 from sequencing logic and bit 9 line from data out bus 106. Thus at the next READ pulse following the activation of line 232, AND gate 236 provides, on its output line 244, an active signal if bit 9 is found ON indicating that there is a character ready in the position addressed by counter 200. This signal sets latch 246, which provides CHARACTER READY ON signal on its output line 248. This signal sets latch 228 which provides CHARACTER AVAILABLE signal on line 226 and is provided to AND gate arrangement 260, which thus provides bits 0-7 and P from data out bus 106 to output register 262. The CHARACTER AVAILABLE signal on line 226 causes receive byte circuit 50 to read output register 262.

AND gate 238 has three input lines, namely line 232, READ pulse line 112 and output line 250 of inverter 252, which receives bit 9 from bus 106 on its input line. Thus if bit 9 is found OFF, AND gate 238 provides an active output signal on its output line 254. This line is connected to one input of OR gate 256, the other input of which is connected to GENERAL RESET line 190. The output signal from OR gate 256 is provided to the reset input of latch 246.

AND gate 240 has three input lines, namely line 232, CHARACTER READY line 48 and bit 10 line from data out bus 106. Thus, when CHARACTER READY line 248 is active, if bit 10 is ON indicating that the character stored in the queue addressed position, is an ending condition character, AND gate 240 provides an active signal on its output line 258 which sets ENDING CONDITION latch 208.

AND gate 243 arrangement is conditioned so that at the next WRITE pulse provided on write line 116 from circuit 174 (FIG. 7), hexadecimal "000" configuration provided on input bus 264 is written into the addressed position of receive queue 100.

AND gate 234 has three input lines, namely line 232, CHARACTER READY line 248 and STEP COUNTER line 114 from sequencing logic 110. Thus once the character, if any stored in the addressed position has been read and the zero configuration written at its place, output address counter 200 is stepped forward by one position.

The operation of circuits of FIG. 7 and 8 will now be described.

When the NCP control program issues a START RECEIVE command, to the high speed line adapter 8, receive bit circuit 46 starts looking for SDLC flags in the received bit stream. When a flag is recognized, it starts looking for any character other than flag, abort or idle.

When it has assembled such a character, it assumes that it is the first character of an SDLC frame and start storing the characters coming from the line into receive queue 100.

If the receive queue is full, circuit 46 overlays the previous character stored with an overrun ending condition and discards the further incoming characters until a new START RECEIVE command is issued by the control program which causes latch 148 to be reset.

On its side, receive byte circuit 50, starts reading receive queue 100, after the START RECEIVE command is issued. If any character was already placed into this position by receive bit circuit 46, receive byte circuit 50 reads the character from output register 262, and transfers it to ping-pong registers 54, 56 or to microprocessor 22 depending whether it is an SDLC data character, or an Address/Control/Ending condition character.

Then, it frees receive queue position just read through the writing of zeroes by means of AND gate arrangement 243, and reads the next character at the address provided by output address counter 200.

The process goes on until:

either there is no character available in the read receive queue 100 position and the end of the SDLC frame has not been detected yet. In that case, the queue position is read until a character is stored in that position by receive bit circuit, since at that time AND gate 234 is not conditioned, so that counter 200 is not stepped forward.

or an ending condition character is detected, which indicates the end of the current SDLC frame. In that case, receive byte circuit 50 will start reading receive queue storage 100 again, when a new START RECEIVE COMMAND is issued by NCP control program.

or receive byte circuit has detected an end of NCP buffer chain, which resets latch 206, and an ending condition has not been detected yet. In that case, receive byte circuit 50 will resume reading receive queue 100 only after a RECEIVE CONTINUE command has been issued by NCP control program, setting latch 206, this command indicates that a new buffer pool is available.

The receive queue access is given either to receive bit circuit 46 or to receive byte circuit 50 according to the following rules.

Priority is given to receive bit circuit 46, when it has a character ready to be stored, CHARACTER SERVICE line 126 is active. The input address counter content is then gated to address bus 102 and receive queue is accessed according to the sequence read/write/step address counter, except if OVERRUN line 166 becomes active after the read operation. In that case, the sequence is read/step address counter/ write.

At the end of the sequence, character service line 126 is turned off through AND gate 186.

When there is no character service request from receive bit circuit 46, receive queue 100 is allocated to receive byte circuit 50, since at that time RECEIVE BYTE CIRCUIT STORAGE ALLOCATION signal on line 232 becomes active.

Receive queue 100 is accessed only if the following conditions are fulfilled:
START RECEIVE or RECEIVE CONTINUE commands issued and ending of frame not yet detected.
End of NCP buffer chain not detected while start receive or receive continue commands are pending.

These conditions are detected by latch 206.

If they are fulfilled, the content of output address counter 200, is gated to address bus 102 and receive queue is accessed according to the following sequences:
Read/Write/Step address counter if during the read cycle, the word read has bit 9, on indicating that a character is available.
If bit 9 is off, step address counter pulse is inhibited through AND gate 234, so that the same position is read until a character is stored at that position by receive bit circuit 46.

If during a receive queue storage access allocated to receive byte circuit 50, receive bit circuit 46 raises CHARACTER SERVICE line 126, the sequence in progress for receive byte circuit 50 is completed before allocating the queue access to receive bit circuit 46.

The detailed operation of receive bit circuit 46 will now be described.

When receive bit circuit has assembled from receive line 47 from DCE 20, a SDLC frame character (address/control/information character) or generated the ending condition character having the format shown in FIG. 6, as a result of the detection of the end of the SDLC frame (flag/abort/idle or flag out of boundary), it sets latch 124 so that CHARACTER SERVICE LINE 126 is active. Receive queue 100 is allocated circuit 46 at the next available storage access timing sequence from sequencing logic 110, through AND gate 128.

At the beginning of this sequence, address M contained in input storage counter 108 is sent to address bus 102. Data in and out busses 104, 106 are gated from/to receive bit circuit 46. During the read storage pulse, queue 100 is read at address M, the word contained at that address is placed on data output bus 106. Logic 143, 144, 146 checks whether bit 9 is on or off.

If it is found off, meaning that the position of address M is free, the normal sequence goes on: during the write pulse provided on line 116, the information character available in register 154 is placed on data in bus 104 by means of AND-OR gate arrangements 152-156 and 160-162, to be written at address M.

During the step address counter pulse on line 144, input address counter 108 is stepped forward by one position so that it contains address M+1.

At the end of step address counter pulse, character service line 126 is turned inactive.

If bit 9 is found on, meaning that the position of address M is not free, the OVERRUN signal is active on line 166. This indicates that receive queue is full.

In this case, encoder 168 generates the ending condition character corresponding to the overrun condition. This character is placed onto data input bus 104.

The overrun signal on line 166 inhibits AND gate 174, so that the write pulse on line 113 from sequencing logic 110 is not provided on line 116. This pulse is gated by AND gate 182, which causes the content of input address counter to be stepped backward by one position, to M−1.

AND gate 140 is not conditioned, so that the step address counter pulse from line 114 is not provided to line 138. It is provided to write line 116 through gating arrangement 176 and the content of the data input bus (overrun ending condition character) is written at address M−1.

At the end of the step address counter pulses, CHARACTER SERVICE line 126 is turned inactive through AND gate 186. OVERRUN line 166 remains active. Receive bit circuit 46 will discard further incoming characters and will not raise CHARACTER SERVICE line 126.

OVERRUN line 166 will be reset by the reception of a new START RECEIVE COMMAND or GENERAL RESET on lines 188 and 190.

The detailed operation of receive byte circuit will now be described.

When a START RECEIVE command or RECEIVE CONTINUE command is issued by the NCP control program, it is passed by microprocessor 8 to the front end scanner hardware.

These two commands set latch 206. If RECEIVE BIT CIRCUIT STORAGE ALLOCATION line 132 is inactive, receive queue 100 is allocated to receive byte circuit 50 and the reading of receive queue 100 starts.

The receive queue allocation to receive byte circuit results in:

the gating to receive queue storage address bus 102 of the content of output address counter, which is assumed to be equal to N;

the gating to receive byte circuit 50 of receive queue data out and data in busses 106 and 104.

The following sequence occurs:

During the read storage pulse, receive queue 100 is read at address N, and the content of the word stored at that address, is placed on data out bus 106. AND gate 236 checks if bit 9 (character ready) is on, meaning that address N position contains a character placed by receive bit circuit 46.

If bit 9 is found on, CHARACTER READY line 248 is active and the content of bits 0 to 7 and P from data out bus 106 is stored in register 262, CHARACTER AVAILABLE line 226 is raised, which signals to circuit 50 that a character is available in register 262.

If bit 10 (ending condition) is found on, latch 208 is set, meaning that the read character stored in register 262 is an ending condition character.

If bit 10 is off, during the write storage pulse, zeroes are placed on data in bus 104 by AND gate 243 to free address N for receive bit circuit 46.

During the step address counter pulse, output address counter 200 is stepped forward by one position so as to contain address N+1.

If CHARACTER SERVICE line from latch 124 is inactive, line 132 is inactive and if CHARACTER AVAILABLE latch 228 has been reset by CHARACTER TAKEN signal sent by circuit 50 when the character in register 262 has been sent by circuit 50 in ping and pong registers 54 and 56 or transmitted to the microprocessor in case of A/C characters, the above process goes on, provided that latch 206 has not been reset by an end of NCP buffer chain sent by circuit 50.

If bit 10 is on, the same process as described above for the write and step forward counter pulses, occurs, but since latch 208 is active, latch 206 is reset and the reading of receive queue stops. Ending condition latch 208 generates an interrupt to microprocessor 8. The microprocessor reads the ending condition in register 262, which means the end of the RECEIVE COMMAND in process.

If address N contains no character, bit 9 is found off, and latch 246 is reset. This prevents the step counter pulse to be provided to output address counter 200, and the same address N position will be read at the next sequence and the process continues until bit 9 is found on during the read storage pulse. At that time the normal process resumes.

When the execution of the RECEIVE COMMAND is completed, the data are in the NCP buffers and the microprocessor which received the A-C fields and the ending condition characters sends a status comprising this information to NCP program via bus 10, and raises an interrupt to NCP program. This interrupt which corresponds to the completion of a RECEIVE COMMAND is handled by the communication controller in the conventional way, and the NCP program gets the status information and the data relative to these commands.

Circuit 46 comprises the conventional means which allows SDLC frames to be processed. These means detects the conditions: CRC correct or CRC not correct, flag off boundary, early flag detection, abort or idle configurations. It comprises a coding circuit not shown which generates the ending condition character having the format shown in FIG. 6.

We claim:

1. High speed line adapter comprising a microprocessor (22) working under control of a stored microcode and a front end scanner (26) attached to at least one full duplex high speed line (9), said adapter being part of a communication controller comprising a central control unit (CCU 1) working under control of a network control program stored in a memory(2), said program allocating a minimum number of buffers in said memory for the reception of frames comprising address, control fields and data, from the line, said adapter being attached to the central control unit through an input/output bus (6) and to the memory through a direct memory access bus (10) and being characterized in that it comprises:

first receiving means (46) connected to the line for receiving the frames and causing the received bits to be arranged into characters comprising a byte of received bits, a bit indicating that a character is ready, and to be checked for generating an ending condition character for each frame indicating whether the frame was correctly received or not, and providing on their output bus (52), the frame characters and the ending condition character for each received frame, receive queue buffer mechanism (48) comprising:

a receive queue (100), having a plurality of addressable locations, the content of which may be read through a data out bus 106 and into which characters may be written through a data in bus 104, input means (FIG. 7) causing the receive queue to be accessed by the first receiving means for writing the frame characters and the ending condition character relative to each received frame when the receive queue is not full and for generating an overrun signal when the receive queue is full, said signal preventing the subsequent received characters to be written in said receive queue, as long as the queue is full, output means (FIG. 8).

second receiving means (50) connected to the output means which causes the receive queue to be read upon reception of receive commands from the network control program, when said receive queue is not accessed by the first receiving means for reading the frame characters and ending condition character relative to each frame and sending the address, control and ending condition bits of said characters to the central control unit through the microprocessor and input/output bus (6) and the data bits of said characters directly into the allocated buffers of the central control unit memory (2) through the direct access memory bus (10).

2. High speed line adapter according to claim 1, characterized in that the frame character and the ending condition character have the same format (FIG. 6) consisting of n bits in which a first bit (bit 9) is set by the first receiving means to a first binary value (1) to indicate that a character is ready and a second bit (bit 10) is set by the first receiving means to a first binary value (1) to indicate that the character to be written into the receive queue is an ending condition character, and to a second binary value (0) to indicate that the character to be written into the receive queue is a frame character, the (n-2) remaining bits being used to carry address, control, data or ending condition bits as the case may be.

3. High speed line adapter according to claim 1 or 2 characterized in that, the receive queue mechanism (48) comprises a sequencing logic (110) which sequentially provides read, write and step pulses to the input and output means which generate therefrom the read and write control pulses to be provided on read and write lines (118,116) of the receive queue to control the access to said queue.

4. High speed line adapter according to claim 3 characterized in that the input means (FIG. 7) comprises:

first receive queue allocation means (124, 128, 130, 186) for generating a first allocation signal which is active when a frame or ending condition character is ready to be written into the receive queue, input address counting means (108, 134, 136) which are set to an initial value when a general reset of the adapter is performed upon reception of receive commands from the network control program and the content of which may be incremented under the control of the step pulse provided by the sequencing logic when no overrun of the receive queue is detected or decremented under the control of the write pulse provided by the sequencing logic when an overrun condition is detected, said counting means providing on its output bus (102) the address of the receive queue when the first allocation signal is active, testing means (143, 144, 146, 148) responsive to the first bit of the character read from the addressed location of the receive queue when the read pulse provided by the sequencing logic is active which causes the character provided by the first receiving means to be written into the addressed location of the receive queue when the write pulse from the sequencing logic becomes active if the first bit of the read character is found at the second binary value and which causes an overrun condition signal to be provided to the first receiving means if the first bit is found at the first binary value, encoding means (168) which are responsive to the overrun condition signal for causing an ending condition character indicative of the overrun condition to be generated, and written into the memory at the next step pulse provided by the sequencing logic.

5. High speed line adapter according to claim 4 characterized in that the input means comprises:

write control pulse generating means (164) which are responsive to the overrun condition signal and to the first allocation signal for providing the write pulse from the sequencing logic to the write control line (116) of the receive queue when the overrun condition signal is not active and for providing the step signal from the sequencing logic to the write control line (116) of the receive queue when the overrun condition signal is inactive, incrementing means (140) which are responsive to the first allocation signal for causing the content of the input address counting means to be incremented under control of the write pulse from the sequencing logic when the overrun condition signal is inactive, decrementing means (182) which are responsive to the first allocation signal for causing the content of the input address counting means to be decremented under the control of the step pulse from the sequencing logic when the overrun condition signal is active.

6. High speed adapter according to claim 5 characterized in that the output means comprises:
- second queue allocation means (206, 222, 225) for generating a second allocation signal which is active when the first allocation signal is inactive and when the network control program initiates a receive command,
- output address counter means which are set to an initial value when the general reset of the adapter is performed upon reception of receive commands from the network control program, and which provides on its output bus the address of a selected queue location, which is accessed when the second allocation signal is active, to be read under the control of the read pulse provided by the sequencing logic and to be written in under the control of the write pulse provided by the sequencing logic,
- character ready detection circuit (236, 238, 246, 256) which are connected to the data out bus of the receive queue, and are responsive to the first bit of the character read from the addressed queue location to provide a signal which is active to indicate that the a character is stored into the addressed queue location,
- incrementing means (234) which are responsive to the second allocation signal, to the step pulse provided by the sequencing logic and to the active signal provided by the character ready detection circuit to cause the content of the output address counter to be incremented,
- ending condition detecting means (240, 208) which are connected to the data out bus of the receive queue and are responsive to the second bit of the character read from the addressed queue location to provide a signal which is active to indicate that an ending condition character is stored into the addressed queue location,
- data output means (260) which are responsive to the active signal provided by the character ready detection circuit to cause the $n-2$ remaining bits from the data out bus of the receive queue to be provided to the second receiving means (50),
- writing means (162, 243) which are responsive to the second allocation signal to write a zero in at least the first bit of the addressed location, under control of the write pulse provided by the sequencing logic.

7. High speed line adapter according to claim 6 characterized in that it comprises a character available latch (228) which is set when the character ready detection means provides an active signal to provide to the second receiving means, a signal which is active to indicate that the $n-2$ remaining bits have to be transferred from the data output means to the second receiving means, and which is reset when said bits have been transferred.

8. High speed adapter according claim 7 characterized in that the second queue allocation means comprises:
- read receive queue latching means (206) which is set by the receive commands initiated by the network control program and reset when the network control program initiates a general reset or provides a signal indicating that there is no buffer available in the central control unit memory or when the ending condition detection circuit provides an active signal,
- gating logic circuit (218) which provides the second queue allocation signal when the read receive queue latching means is set, the first queue allocation signal is inactive and the character available latch is reset.

* * * * *